United States Patent [19]
Zandveld et al.

[11] Patent Number: 5,659,797
[45] Date of Patent: Aug. 19, 1997

[54] SPARC RISC BASED COMPUTER SYSTEM INCLUDING A SINGLE CHIP PROCESSOR WITH MEMORY MANAGEMENT AND DMA UNITS COUPLED TO A DRAM INTERFACE

[75] Inventors: Frederik Zandveld, Hulsberg, Netherlands; Matthias Wendt, Würselen, Germany; Marcel D. Janssens, Palo Alto, Calif.

[73] Assignee: U.S. Philips Corporation, New York, N.Y.

[21] Appl. No.: 896,062

[22] Filed: Jun. 9, 1992

[30] Foreign Application Priority Data

Jun. 24, 1991 [EP] European Pat. Off. ............. 91201610

[51] Int. Cl.$^6$ .......................... G06F 13/28; G06F 13/42; G06F 12/00
[52] U.S. Cl. .......................... 395/842; 395/846; 395/285; 395/432
[58] Field of Search ................................. 395/425, 400, 395/275, 325, 842, 843, 844, 845, 846, 847, 848, 285, 286, 431, 432, 438, 485

[56] References Cited

U.S. PATENT DOCUMENTS

| | | | |
|---|---|---|---|
| 4,348,720 | 9/1982 | Blahut et al. | 395/846 |
| 4,371,932 | 2/1983 | Dinwiddie, Jr. et al. | 395/841 |
| 4,514,808 | 4/1985 | Murayama et al. | 395/307 |
| 4,550,368 | 10/1985 | Bechtolsheim | 395/416 |
| 4,669,043 | 5/1987 | Kaplinsky | 395/403 |
| 4,794,524 | 12/1988 | Carberry et al. | 395/800 |

FOREIGN PATENT DOCUMENTS

| | | |
|---|---|---|
| 2201269 | 8/1988 | United Kingdom . |
| 9102311 | 2/1991 | WIPO . |

OTHER PUBLICATIONS

Braune et al., "68000-type microprocessor packing peripheral subsystems smooths workstation design", Electronic Design, vol. 34, No. 10, May 1986, pp. 229-234.

Bursky, "16-bit processor has 8-bit foundation", Electronic Design, vol. 35, No. 7, Mar. 19, 1987, pp. 48-50.

User's Guide, Cypress Semiconductor, San Jose, CA, USA, Feb. 1990, pp. xvii to xxi, 1-1 to 1-7.

*Primary Examiner*—Glenn Gossage
*Attorney, Agent, or Firm*—Debra K. Stephens

[57] ABSTRACT

A computer system includes a single-chip central processor (20) with handshaking and direct memory access (DMA) controllers for accommodating first and second types of DMA to a dynamic random access memory (DRAM) (34). The single-chip central processor (20) has a kernel processor (22) having cache, a memory management and control unit (26), and a coprocessor (24). The computer system further includes a bundle of lines (28), including data lines, address lines and row address strobe (RAS), column address strobe (CAS), output enable (OE), and write enable (WE) lines for coupling the memory management and control unit (26) to the DRAM (34), and a plurality of data exchanges (33, 37) coupled to a plurality of first and second attach controllers (32, 36). The coprocessor includes a plurality of DMA controllers (240-246) for storing addresses and for storing a length representing a number of data items to be transferred. Additionally, each DMA controller is coupled by a separate line (303) to a respective first attach controller for accommodating a first type of DMA, between the memory and the plurality of data exchanges, which generates addresses of contiguous memory. The plurality of second attach controllers accommodates a second type of DMA between the memory and the plurality of data exchanges. The coprocessor further includes a plurality of handshake controllers (250-256), each for executing handshaking with a respective second attach controller, not under control of the kernel processor.

11 Claims, 2 Drawing Sheets

5,659,797

SPARC RISC BASED COMPUTER SYSTEM INCLUDING A SINGLE CHIP PROCESSOR WITH MEMORY MANAGEMENT AND DMA UNITS COUPLED TO A DRAM INTERFACE

FIELD OF THE INVENTION

The invention relates to a computer system, including a single-chip central processing unit (CPU) or processor having a kernel processor having cache means, and a memory management unit/memory control unit (MMU/MCU). The system also includes a dynamic random access memory (dynamic RAM or DRAM) physically attached to the MMU/MCU by means of a bundle of lines including data lines, address lines, row address strobe (RAS) means, column address strobe (CAS) means, output enable means and write means. Such a computer system also has attach control means for allowing attachment of various data exchange means.

The invention is applicable to, although not being limited to, a processor of the scalable process architecture (SPARC), reduced instruction set computer (RISC) type as described, for example, in USER's GUIDE, by Cypress Semiconductor, San Jose, Calif., USA, February 1990, especially the foreword and introduction chapters thereof. The inventors of the present invention have found that the known processor, although having various advantageous features, such as a much reduced (i.e. in number) instruction set and various other features, would benefit appreciably from additional system features added, especially with respect to direct memory access capability for various peripherals connected to said bundle, while maintaining direct interfacing to DRAM, with inherent high transfer speed.

SUMMARY OF THE INVENTION

Among other things, it is an object of the present invention to have direct physical attachment of the processor to dynamic RAM memory for fast accessibility thereof as main memory. Main memory is contrasted here to, on the one hand, background memory such as disk; and, on the other hand, in-processor cache storage. It is also desired to obviate the need for a separate Input/Output bus (I/O) that would require many additional pins to the central processor and also additional wiring. Secondarily, the present solution particularly advantageously distinguishes from those familiar bus organizations as VME (owned by VME Laboratories of South Denton, Tex., FUTUREBUS (owned by Forth Co. of Neu Biberg Germany), MULTIBUS (owned by Intel of Santa Clara, Calif.) etc. In these, memory control aspects such as those relating to bank select, refresh control, bus priority granting, etcetera, are separate and additional system elements. Thirdly, maintaining the central processor as overall bus manager by virtue of its MMU/MCU provides a systematic organization. Generally, the increased functionality of the central processor chip would increase its cost by only a limited amount while obviating the need for substantial off-chip hardware.

According to one of its aspects, the object is realized in that the attach control means is external to the central processor and is also connected to the bundle in parallel to the dynamic RAM. The central processor includes, external to the kernel processor, a coprocessor which includes a plurality of first direct memory access (DMA) control elements. Each of the control elements, by means of respective address/length storage therein, accommodates a first type of direct memory access between the main memory and an associated respective data exchange means via the latter's associated attach control means.

Such a central processor, therefore, has its kernel logic that executes appropriate user programs, generally, represents a classical processor, and also executes system chores generally. The small on-chip coprocessor executes DMA operations. The DRAM bundle lines are also used for I/O tasks as much as possible, thus leading to low costs. The above features are particularly advantageous for peripheral controllers that have little on-board or on-chip intelligence, which is often sufficient for peripherals that need only a simple addressing sequence structure. Only a very elementary interaction between such controllers and the central processor is necessary to discern between these peripherals and their wants. Almost no interaction is necessary with the kernel processor itself. This kind of simple organizational structure often occurs with bulk data transfers, for example of large records between background disk storage and main memory. The main memory addresses now form a contiguous series, and no action is necessary apart from a) incrementing or decrementing by a uniform amount, and of course, b) accessing the memory itself.

Advantageously, each data exchange means has a respective request wire to its associated memory access control element for transferring a respective first request signal for a data item transfer. The central processor also has emulating means for emulating in response to any first request so received, an associated first acknowledge in the form of a respective bundle-carried address. In this way, for each exchanged data item of restricted length, such as 1, 2, or 4 bytes, only the transfer request signal needs to be sent to the coprocessor means. No acknowledge wire is necessary. The recognition of the address by the peripheral can be executed in a standard way. Generally, the peripheral is mapped on a part of the overall address space. Generating the address of the peripheral effectively selects and activates the peripheral for communication and any applicable address of the peripheral would thus translate into an activation signal, such as a chip select signal. This chip select signal can then find second usage as an acknowledge signal.

Another possibility is that the address can be passed through a decoder. The decoder decodes any address intended for the peripheral in question and can thus select the peripheral. In addition to the above data item transfer request to the coprocessor, a standard attentions or completion interrupt signal generated due to a full I/O transaction, may be transferred along an associated wire or wires of the bundle. The signal generated due to the full I/O transaction would be directed to the kernel processor and could relate to many bytes. Such a transaction then may imply generation of an address, updating of status, etcetera, that the coprocessor could not handle. For these relatively infrequent occurrences, the ensuing load of the kernel processor is not a great problem.

Advantageously, the control elements are subject to reception of virtual I/O addresses via the bundle and generated by any of the data exchange means. The MMU/MCU accommodates reception of virtual I/O addresses from the kernel processor as well as from the coprocessor for translation into bundle transportable real addresses. Inasmuch as the kernel processor may produce virtual addresses for subsequent translation in the memory manager, the coprocessor may also provide addresses as virtual addresses. No extra hardware would be necessitated by this enhanced flexibility, except for a detector for a real/virtual address indicator bit.

In conclusion, according to the above organization, no bytewise interrupt of the kernel processor is necessary, inasmuch as DMA is effected. Moreover, only a little DMA logic for each separate data stream is necessary. Virtual (as well as real) I/O-addresses are allowable. Finally, the bundle is identical to the DRAM standard bus organization, obviating the need for any off-chip DRAM control logic. In consequence, the address maintenance is consistently executed in the DMA-sub-system of the central processor.

Advantageously, the central processor includes a second plurality of handshake control elements, each for executing a handshake with a respective second direct memory access control element. The DMA control element is located externally to the central processor in an associated further attach control means. Each such further attach control means is attached to respective further data exchange means. Each such further attach control means accommodates, for each second control element, a second type of direct memory access between the main memory and the associated further data exchange means, without assistance from the kernel processor. Certain peripheral control units have sufficient onboard intelligence for controlling DMA-transfer themselves. This is the case for peripherals with a complicated address sequence structure, which, inter alia could occur if the peripheral itself had a plurality of information streams intermixed. This would require a plurality of addresses to be used in alternation. Executing such with first type DMA would necessitate an interrupt for the kernel processor at each change-of-address. For this reason, in such a case of intermixed streams, the various addresses are kept available in the peripheral controller (attach control means) for copying into the local control element as required. An example of such peripheral would be an ISDN (Integrated Service Data Network) chip that supports a great variety of coexistent input paths and output paths. Again here, attention/completion interrupts are to be handled by the kernel processor. The peripheral control may, for example, control a list of allocated buffers, and, upon exhaustion of an active storage space, interrogate the list for a free buffer, without assistance from the kernel processor.

Advantageously, the computer system allows the processor as well as any of the second direct memory control elements, to generate virtual memory addresses or virtual addresses to the memory manager for translation into bundle-transportable real addresses. This further reduces the burden on the central processor, thereby raising system speed.

Advantageously, if the virtual address length accommodates at least two times a real column address length, the system has address shift means for bankwise demultiplexing the column addresses over a first and a second mutually exclusive part of bundle address wires allocated to the virtual address. In the embodiment hereinafter, row and column addresses are 16 bits each. The virtual address is 32 bits (all these numbers indicating upper boundaries, inasmuch as lower values would be operative). This means that any column address would fit twice in the virtual address path width. The memory load is now bankwise distributed among two halves of the virtual address path for so minimizing capacitive load, and consequently, raising speed still further. Moreover, this can advantageously be combined with an organization that has cache defined bank-wise.

Advantageously, the central processor has a third plurality of transfer request reception means respectively associated with each of the first direct memory access control elements and each of the second plurality of handshake control elements combined. Advantageous values for the third plurality are 4,8. With respect to a typical example, to wit, exchanges with respect to optical/magnetic disks, the number of coexistent transfers rarely exceeds 2. However, such limited provisions give a great boost to system performance. Time-multiplex organization among the various transfers can be cyclic, prioritized, or otherwise.

The invention furthermore relates to an integrated single-chip processor for use in such computer system. The computer system may be what is presently a high-level, professional workstation, but in the future, all kinds of low-end solutions could be feasible, such as personal computers of various capability, printers, or even television-centered electronics. A particular use is for automotive electronics in which very sophisticated as well as quite elementary stations would communicate. In such an environment, which is particularly relevant to the present invention as well as an aspect thereof, boardcomputers, navigational computers, CD-ROM (Compact Disc-Read Only Memory) stations, RAM stations (external RAM connected by a bus to the processor), digital Radio Data System Tuners, as well as smart headlight controllers, door/window/trunk sensors, and engine actuators are present. For reference, copending European Patent (EP) application 91201224.2, corresponding to U.S. application Ser. No. 07/868,747 filed Apr. 14, 1992, now abandoned in favor of continuation application Ser. No. 08/386,605, filed Feb. 10, 1995 is incorporated herein. Various further advantageous aspects are recited in dependent claims.

BRIEF DESCRIPTION OF THE FIGURES

The invention will be further explained hereinafter with respect to a preferred embodiment, first on the level of hardware blocks with reference to the Figures, and then on a detailed register description/bit specification level. As regards to the Figures.

DESCRIPTION OF THE PREFERRED EMBODIMENTS

Figure 1:
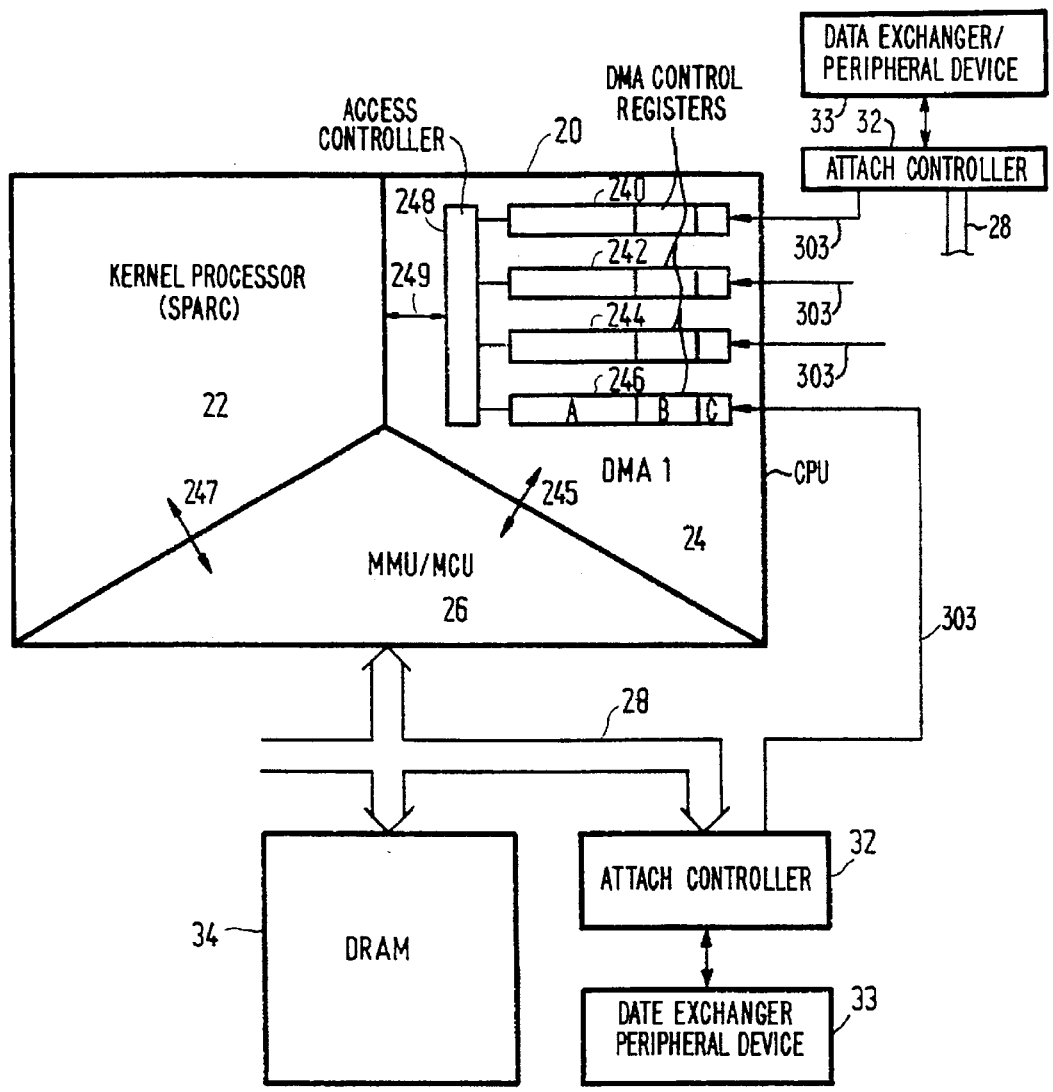
FIG. 1 is a block diagram of a first embodiment of a computer system of the invention.

FIG. 1 is a block diagram of a computer system according to the invention, featuring a first type of direct memory access. Block 20 is a central processor, based on a SPARC with cache architecture symbolized by block 22. Generally providing the kernel processor (22) with a cache allows for higher processing speed. Now, inasmuch as the kernel processor 22, in combination with single-level or plural-level cache is generally equivalent to a conventional SPARC single-chip processor, no extensive disclosure thereof is deemed necessary. Additionally, block 26 represents an MMU/MCU. On a high level it executes memory management features, including caching and virtual address translation data, priority determination (among in-processor processes, and among various requests for bus access), parity generation/detection, and shifting which assures that any data item generated by the processor that is less wide than the data bus, the latter being 32 bits, is shifted to the appropriate wires thereof, usually the least significant ones. On a lower level, the MMU/MCU block 26 provides bus timing signals, memory enabling signals, address/data buffering and the like. Generally such interfacing to a DRAM bus is conventional. Coprocessor 24 has a plurality of DMA control elements for accommodating a first type of DMA access between the dynamic RAM and each of the data exchange means. The plurality of DMA control elements includes first type DMA control means. In particular this is represented by four storage address/transfer length registers 240, 242, 244, 246, that have a part A for storing a source/destination address, a part B for storing a length, and a part C for storing a transfer request bit and further control signals as will be discussed in more detail hereinafter, and which have been indicated only for register 246. The transfer request bit operates for byte (or double byte=half word, or full word) level and is reset upon granting of the transfer. The address indicates where the DMA access for a particular data exchange means or peripheral device 33 is to happen next, or where, after a pause, it may recommence. Furthermore, coupled to each address storage register, a length counting register is present which is conventionally loaded with a length of a packet to be transmitted and is decremented in synchronism the transfers on a bus 28 for the DMA access in question. The address part is either incremented or, as the case may be, decremented, with the transfers on bus 28 regarding this particular DMA access. The transfer may be of two type using two-addresses; in this case both a source address register and a destination address register would be present, both addresses then being stepped in synchronism. Zero detection on the length part of the register terminates the associated DMA transfer and causes a completion interrupt to the kernel processor. The registers 240 . . . 246 are accessed by an access controller 248, that may read and write in the registers, perform zero detection, load the registers, perform incrementing/decrementing, and along line 249, communicate with the kernel processor 22. The interrupt bit C is set through a signal on line 303 emanating from control unit or attach control unit 32 which shows allowed attachment of data exchange means 33. Control unit 32 has line 303 dedicated. Other registers 242 and 244 have similar interrupt lines to data exchange units as shown for registers 240 and 246. For simplicity, no processor-determined exchange of these lines between peripherals has been shown, although in principle, this would be possible. In practice, the present invention allows such exchange for type 1 DMA described with respect to FIG. 1. The request line 303 is used only for signalling a request for a next information transfer (in either direction). Upon granting of the request, an address for DRAM 34 appears on bus 28, which address functions for acknowledging the earlier request on line 303. This address is detected in an address detector, not shown, to be intended for attach control device 32. Usually, only a limited part of the address need be detected. Various possible embodiments have been discussed supra.

Furthermore, block 34 is a conventional dynamic RAM main store that has RAS, CAS, output enable (OE) connection, and write enable (WE) connection lines, that are directly linked to bundle 28, the relevant lines being directly fed by MMU/MCU 26. Also, addresses may be provided either as emanating from kernel processor 22 or from coprocessor 24, after, as the case may be, conversion in MMU/MCU 26. Data may be bidirectionally provided by DRAM 34, processor 22, i.e. MMU/MCU 26, and each attach control unit 32. In principle, attach control unit(s) could be provided for a data exchange means. 33 that is unidirectional, such as a printer. Memory control signals, such as RAS, CAS, OE, WE are exclusively provided by MMU/MCU 26. Attach control unit 32 does not contain DMA features. All DMA bookkeeping with respect to first type DMA exchanges is done by coprocessor part 24. In addition to the byte-level half-word/full-word transfer requests on line 303, the attach control unit may generate on bus 28, attention/completion interrupt requests for effecting multi-byte-full-transactions, and for signalling error conditions, so-called -burst mode-, etcetera. These have not been shown for reasons of brevity. Furthermore, the communication between the subsystems of the central processor, kernel processor 22, coprocessor 24, and MMU/MCU 26 have been indicated only symbolically by means of arrows 245, 247, 249, respectively.

Figure 2:
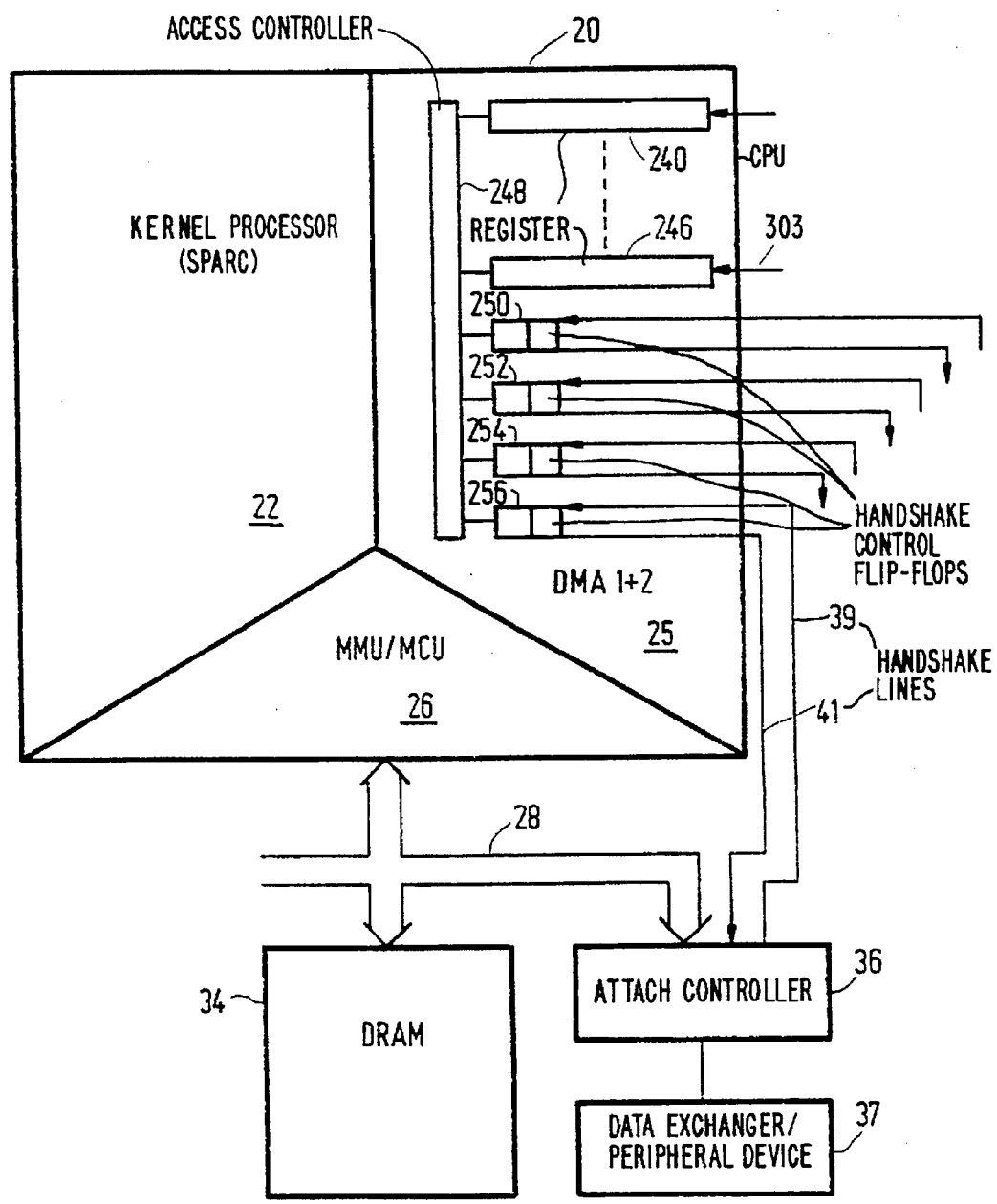
FIG. 2 is a block diagram of a second embodiment of a computer system of the invention.

FIG. 2 is a block diagram which in similar fashion as above, exemplifies a second type of direct memory access organization. The kernel processor 22, MMU/MCU 26 and bundle 28 appear in similar fashion as in FIG. 1, as does DRAM 34. Block 36, however, symbolizes an attach control unit of a different character than the attach control unit 32 in FIG. 1. In particular, an embodiment of the present invention allows for four parallel DMA transfers of the first type as explained with respect to FIG. 1 (four units 32 in parallel) in combination with the parallel attachment of four attach control units 36 in parallel such as shown in FIG. 2. The organization shown in FIG. 1 is preferable for peripherals that have a simple addressing structure, such as bulk transfer generating background memory. After the first address of a transfer, all other addresses constitute a contiguous sequence until completion of the transfer. The second type of DMA transfer discussed with respect to FIG. 2, is preferable for the case of less structured address sequences, such as where the sequence of contiguous addresses is frequently interrupted in favor of another address that is not in the sequence previously under execution. A first example is a single control unit attaching multiple data communication lines. In a particular embodiment, attach control unit 36 is used in an ISDN (Integrated Services Data Network) for attaching up to 18 separate data exchange means that could in alternation, require direct memory exchange operation. Often, each such DMA operation amounts to a less extensive transfer than is required for the first type of DMA transfers. The ISDN standard for mapping various transfer operations on respective channels is common general knowledge. In consequence, the attach control unit 36 would be more sophisticated than the attach control unit 32 in FIG. 1 and advantageously, the address and length administration of the second type DMA transfer is handled by the attach control unit 36, rather than in coprocessor 24 as of FIG. 2. The coprocessor 25 in FIG. 2 has the same features as coprocessor 24 in FIG. 1 which features have been numbered identically, i.e., registers 240 . . . 246 and access controller 248. Now however, in addition to provision for the first type of DMA, coprocessor 25 provides for a second type of DMA transfer, by means of relatively simple apparatus. For each second type of DMA, there is a pair of handshake lines, such as 39, 41. A request signal appears on line 39 which sets flip-flop 256. The access controller 248 in the first place has the same functions as the access controller 248 in FIG. 1 with respect to elements 240 . . . 246. Additionally, the access controller 248 interrogates flip-flops 250 . . . 256 for detecting raised interrupt signals. If such signals are detected, and if the associated request can be granted, the flip-flop is reset, which in the case of flip-flop 256 would signal an acknowledge on line 41 to attach control unit 36. The handling of the associated interrupt is by itself using conventional methods and inherent intelligence of attach control unit 36. Interrogation by access controller 248 can be along conventional lines, such as round-robin with fixed-length time slices or without, priority driven, or otherwise. For brevity this has not been detailed. Both DMA-types can be intermixed as need be; the control elements 240 . . . 246, 250 . . . 256 can have the same interrogation recurrency priority, etcetera, or not, as corresponding to importance attributed to data exchange means 33, 37, etcetera.

FURTHER DESCRIPTION OF THE ORGANIZATION

Hereinafter, a preferred embodiment of a computer system according to the invention will be disclosed in more detail. In this embodiment, the DRAM interface allows for a direct attachment of two banks of dynamic memory (without the need for external logic). It is extendable to allow for up to eight banks of memory through use of bank select bits (this will cost some external logic and performance). Each bank can maximally be 64M byte (this configuration requires 16M*1 DRAMs).

The bus is provided with the following pin designation:

RAS[1:0]. These pins can be directly attached to the RAS signal pins of the DRAM. Two RAS signals are provided to allow attaching two memory banks.

CAS[7:0]. These pins can be directly connected to the CAS signal pins of the DRAM. Eight CAS signals allow selecting bytes in two memory banks.

OE[1:0]. These signals can be directly connected to the output enable (OE) line of the DRAM. Two signals are provided to allow attaching two banks of dynamic memory.

WE[1:0]. These signals can be directly connected to the write enable (WE) line of all the DRAM. Two signals are provided to allow attaching two banks of memory.

D[31:0]. The 32 bit data bus can be directly connected to the DRAM input/output pins.

P[3:0]. The parity bits can be directly connected to the input/output lines of the DRAMs used for parity.

A[23:12], A[11:0]. The address pins can be directly connected to the address inputs of the DRAM: address bits 23:12 to BANK1 (or other odd banks) and address bits 11:0 to BANK0 (or other even banks). For a 256 k organization only the lower nine address bits (for either bank) will contain valid information. For a 1M organization, only the lower ten address bits will be used. For a 4M organization, the lower eleven bits are used, and for a 16M organization all bits are used. The organization to be used is determined by the DRAM control register.

A[31:29]. These bits will reflect the bank select bits of the physical address and can be used to distinguish between more than the two memory banks provided for. These address bits need then to be decoded and, together with the RAS, CAS, OE and WE signals generate signals for more banks that behave as slaves.

On-chip control registers defined as not affected on a reset will hold their old value on "warm" reset, and contain an undetermined value on a "cold" reset.

Reserved bits in all registers will read as zero; writing to them has no effect.

Setting and resetting of a single bit in some registers is accomplished through a read-modify-write. Software ensures that this is an atomic operation, which is aptly defined in the processor kernel.

Write operations to on-chip memory locations (i.e. registers, caches, translation look-aside buffer, all of the processor) are delayed write operations. That is, if any of the three instructions following the write instruction reads its destination, the value being read will be undefined and will have no further effects. By itself, such pipelining is conventional technology.

The DRAM control register is used to specify size of the DRAM banks and number of banks used in the system. Although the DRAM can be made to look contiguous through use Of the virtual address mapping, not all applications of the processor will use the MMU/MCU and provide such a mapping. For these applications (controller type), it is necessary to provide a contiguous physical DRAM address space. The DRAM control register indicates to the processor what size of DRAM to expect, and the latter will react by driving the proper address lines. If more than one memory bank is used, all are of the same size. Parity is controlled through this register (Parity Test, Parity Enable). The DRAM control register contains the following information:

| reserved | | RD | NB | | MS | | PE | PT |
|---|---|---|---|---|---|---|---|---|
| 31 | 7 | 6 | 5 | 4 | 3 | 2 | 1 | 0 |

RD=refresh disable (0 enabled, 1 disabled)
NB=number of banks 11:8 banks
   10:4 banks
   01:2 banks
   00:1 bank
MS=memory size 11:265 k (9 address pins used)
   10:1M (10 address pins used)
   01:4M (11 address pins used)
   00:16M (12 address pins used)
PE=parity enable (0 disabled, 1 enabled)
PT=parity test (0 normal, 1 reverse parity)

The refresh register contains a counter value which determines how often a (one line) refresh is generated. The two memory banks are refreshed at the same time. The processor refreshes with a CAS before RAS. CAS before RAS has the advantage that other bus masters can take over refresh without synchronization problems.

Refresh control register: PA=0×40000020(r/w)

| reserved | | RL | 25 ns periods between refresh | |
|---|---|---|---|---|
| 31 | 17 | 16 | 15 | 0 |

RL=refresh lost (this bit is set when a refresh interrupt could not be serviced because the processor could not get the bus).

On reset, memory refresh will be enabled, the memory size will be 16M (one bank), and parity and parity test are disabled (i.e. the DRAM control register is loaded with zero). The refresh control register control register is loaded with what is considered to be the standard refresh count plus a safety margin of 10% (64 refresh cycles/ms: 0×230). The above initialization will take care that, whatever the real size of the DRAM, it is refreshed correctly. If a smaller memory is used, the address space will contain holes until the proper initialization has taken place. Address 0×20000000–0× 200007FF have contiguous DRAM locations attached to them, whatever the number of banks or DRAM sizes used in the underlying system. These addresses can be used to locate startup data and stacks.

Besides a DRAM interface, the processor contains interfaces to I/O devices, a DMA interface and a possibility for other masters to obtain control.

EXTENSIVE DESCRIPTION OF THE TWO TYPES OF DMA INTERFACES

The following pins are associated with a first type of DMA:

DMAREQ[7:4]. These pins are the DMA request pins for each of the four type one DMA channels. When asserted, the DMA circuitry will transfer data from/to the DMA device according to the control register(s) attached to the specific DMAREQ pin.

According to the preferred embodiment, each type one DMA channel has a request pin attached to it plus four control registers. The first control register specifies the address from which the data is to be read from, the second register specifies the address where the data needs to be written, and the third register specifies the number of bytes that need be transferred, which address(es) to increment or decrement, and by how much (i.e. the size of each transfer in bytes). The last register is a temporary data register. All these four registers communicate with the DRAM interface via a bus 28. When a request is made on one of the DMAREQ lines, it is arbitrated with other contenders for the bus. When it is serviced, the DMA controller in the processor does a read from the "from-address" (associated with this channel) into the DMA channel's temporary data register. The contents of this register are then written to the "to-address" (again the one associated with this channel). From the user's viewpoint, this is an atomic action. The number of bytes that are transferred (maximally 4 bytes) is specified in the third register mentioned above. The length is decremented by this number, and the addresses are incremented or decremented by this number. Once the length counter reaches zero, an interrupt to the kernel processor 22 is generated if the corresponding interrupt enable bit is set. All type one DMA interrupts are ORED. To be able to determine which channel had caused an interrupt, the interrupt pending register is used, which corresponds to the separate flipflops shown in FIG. 1. When an error occurs during a DMA transaction, an interrupt is used to signal the kernel processor 22. At the occurrence of any of the above interrupt situations (whether they are enabled or not), the Channel Enable bit in the channel control register will be reset automatically.

Since the DMA transfer is basically a load store cycle, the addresses that are used are treated the same way normal addresses are. This allows one to do both virtual and/or physical DMA, i.e. independent of whether the actual address in the relevant register is a virtual address or a physical address When DMA has to take place between two devices with different transfer widths, the DMA channel controller takes care of the assembly and disassembly of the data (of e.g. bytes in words). The intermediate data register reserved for each channel is used for this purpose. This leads to the situation that a single DMA transaction can be non-atomic on the bus.

The DMA control and status register provides a way to set a DMAREQ line through software. This mechanism can be used to do a block copy between any two devices (which can be one and the same device).

A type one device that does not want to be read from or written to, but wants an acknowledge instead, is supported by generating the acknowledge from the read/write to the DMA device.

The DMA channel control and status register allows one to enable or disable each channel separately, and to specify whether the channel can use burst mode accesses, or always has to do its DMA on a cycle stealing basis. When DMA in burst mode is enabled for a certain channel, this DMA device can "hold" the bus, as long as it keeps the DMAREQ line asserted. Other contenders for the bus with higher priority (with the exception of refresh) will not be allowed to obtain control until this device has completed its access. If a channel is not enabled for burst mode, it competes with other bus requesters on a cycle by cycle basis. As long as the channel under discussion is the highest priority bus contender, it will be allowed to transfer, but when another higher priority request comes in, the latter will be serviced instead.

The following pins are associated with a second type DMA:

DMAREQ[3:0]. These pins are the DMA request lines for type two DMA devices.

DMAACK[3:0]. These pins are DMA acknowledge pins for the type two DMA devices (corresponding with DMAREQ[3:0]).

MAS. This signal is used to clock in he address issued by a type two DMA device.

MDS. This signal is used both to synchronize the data issued by a type two DMA device, and to signal when the DMA device is ready to receive data.

MRD/WRN. This signal is used by a type two DMA device to indicate whether it wants to read or write.

MSIZE[1:0]. This signal is used by a type two DMA device to indicate a data transfer of a size different from the physical data bus size. When an 8 bit data bus is used, these signals are not used. When a 16 bit data bus is used, MSIZE[1] follows the definition of UDS, MSIZE[0] that of LDS(68000). When a (24 or) 32 bit data bus is used, MSIZE[1:0] follows the definition of the size bits for the MC680x0.

MRDY. This signal is used to signal completion of a type two DMA transaction.

A type two DMA device starts its access by asserting DMAREQ. The processor will respond by asserting the corresponding DMAACK and will put all other signals in tri-state.

The DMA device can now hand an address and read/write signal to the processor by asserting MAS. The processor will clock in the address from either the data bus or the address bus (this is determined by a bit in the channel control register). On a DMA write transfer, the DMA device gives the data to the processor by asserting MDS. On a read, MDS indicates that the DMA device is ready to receive data. Depending on the direction of the transaction, the latched address is added to the "from" or "to" address register and treated as a physical or virtual address (depending on a bit in the channel control register). The DMA device must deassert the address bus; the data bus may be driven (the processor will drive the bits that are not yet driven by the DMA device, and drive the bits that the DMA device drives only when the associated bit in the control register is set). The processor will now transfer the data to or from the indicated address, asserting MRDY when it is done (on a write) or when the data is available (on a read). If the DMA device wants to hold the bus, it must keep its DMAREQ line asserted.

A 32 bit type two DMA device can only transfer to/from a 32 bit device. A 16 bit device can transfer to/from any device that supports half word accesses. The processor expects the data on data lines D[15:0], and will take care of duplicating this data on D[31:16] if so required. An 8 bit DMA device can transfer to/from any device that allows byte access. The processor expects the data on D[7:0], and will duplicate it on D[31:24], D[23:16], D[15:8] if so required. The size of the address/data bus the DMA device will use, can be specified in the control register.

Both types of DMA have a "to" address register, a "from" address register, a DMA data register (type one only), and a control and status register.

For each channel (c=0 . . . 3 for type two, c=4 . . . 7 for type one) the following registers are used:

DMA channel from address register: PA=0×74000c10(r/w)

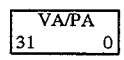

DMA channel to address register: PA=0×74000c20(r/w)

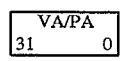

DMA type one channel control register: PA=0×74000c40 (r/w)

| COUNT | | SR | | IT | | ST | | IF | | SF | | VT | VF | BE | EC |
|---|---|---|---|---|---|---|---|---|---|---|---|---|---|---|---|
| 31 | 13 | 12 | 11 | 10 | 9 | 8 | 7 | 6 | 5 | 4 | | 3 | 2 | 1 | 0 |

COUNT=transfer count (number of bytes to be transferred)
SR=software request (0=nor request, 1=request)
IT=in/decrement to address:

| IT[1:0] | increment/decrement |
|---|---|
| 00 | no in/decrement |
| 01 | increment |
| 10 | decrement |
| 11 | no in/decrement |

ST=SIZE to transaction (see definition of SIZE bits)
IF=in/decrement from address (see definition of IT field)
SF=SIZE from transaction (see definition of SIZE bits)
VT=virtual to address (0=physical, 1=virtual)
VF=virtual from address (0=physical, 1=virtual)
BE=burst enable (0=burst disabled, 1=burst enabled)
EC=enable channel (0=channel disabled, 1=channel enabled)

DMA type two channel control register: PA=0x74000c40 (r/w)

| reserved | | DB | AS | | DS | | AD | RD | VT | VF | BE | CE |
|---|---|---|---|---|---|---|---|---|---|---|---|---|
| 31 | 11 | 10 | 9 | 8 | 7 | 6 | 5 | 4 | 3 | 2 | 1 | 0 |

DB=drive data bus (0=not driven, 1=driven)
AS=address size (see below)
DS=dat size (see below):

| address/data size [1:0] | bus size used |
|---|---|
| 00 | 8 bits ([7:0]) |
| 01 | 16 bits ([15:0]) |
| 10 | 24 bits ([23:0]) |
| 11 | 32 bits ([31:0]) |

AD=take address from address/data bus (0=address, 1=data)
RF=refresh before DMAACK (0=no, 1=yes)
VT=virtual to address (0=physical, 1=virtual)

VF=virtual from address (0=physical, 1=virtual)
BE=burst enable (0=burst disabled, 1=burst enabled)
EC=enable channel (0=channel disabled, 1=channel enabled)
Note: Whenever a DMA channel uses a virtual address it will be translated using the current context value.

DMA channel data register (type one only): PA=0x74000c80(r/w)

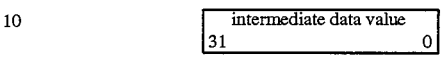

The DMA channel control and status register is initialized to zero on reset. The other channel registers are not affected during resets.

We claim:

1. A computer system, comprising:
   (a) a single-chip central processor (20) comprising:
      (i) a kernel processor (22) having cache means,
      (ii) a memory management and control unit (26), and
      (iii) a coprocessor (24);
   (b) a dynamic random access memory (34) coupled to said memory management and control unit;
   (c) a bundle of lines (28) including data lines, address lines and, row address strobe (RAS), column address strobe (CAS), output enable (OE), and write enable (WE) lines for coupling said memory management and control unit to said memory;
   (d) a plurality of data exchange means (33,37); and
   (e) a plurality of attach control means including a plurality of first attach control means and a plurality of second attach control means, said plurality of attach control means being coupled to respective data exchange means, each of said plurality of attach control means being external to said central processor and also being connected to said bundle in parallel with said memory, each data exchange means being coupled to a respective attach control means of the plurality of attach control means,
   wherein said coprocessor is disposed within said central processor but external to said kernel processor, said coprocessor comprising a plurality of direct memory access (DMA) control means (240–246), each including storage means for storing addresses of memory locations to be accessed and for storing a length representing a number of data items to be transferred,
   said plurality of first attach control means accommodating a first type of DMA between said memory and the plurality of data exchange means, said first type of DMA including generating addresses of contiguous memory, and
   said plurality of second attach control means accommodating a second type of DMA between said memory and the plurality of data exchange means, said coprocessor further comprising a plurality of handshake control means (250–256), each coupled to a respective second attach control means of the plurality of attach control means, for executing handshaking with the respective second attach control means not under control of said kernel processor.

2. A computer system as claimed in claim 1, wherein:

separate lines couple each DMA control means and respective attach control means; and each separate line comprises a dedicated request wire, each separate line coupling a respective DMA control means of the plurality of DMA control means and a respective first attach control means for transferring, from the respective first attach control means to the respective DMA control means, a first request signal for a data item transfer, said central processor, in response to the first request signal, transmitting via the bundle, a response address to the respective first attach control means, said response address functioning as an acknowledge signal.

3. A computer system as claimed in claim 1, wherein each of said handshake control means is coupled by a respective two wire bidirectional communication connection (39, 41) to the respective second attach control means of the plurality of second attach control means.

4. A computer system as claimed in claim 1, wherein said kernel processor is connected to receive an attention/completion interrupt signal from said bundle.

5. A computer system as claimed in claim 1, wherein said central processor further comprises access control means (248) for receiving transfer requests from the plurality of DMA control means and said plurality of handshake control means.

6. A computer system as claimed in claim 1, wherein each of said plurality of DMA control means is coupled to receive virtual I/O addresses from at least one of said plurality of data exchange means via said bundle, and coupled to receive virtual I/O addresses from said kernel processor and said coprocessor for translation to real I/O addresses, said dynamic random access memory responding to real I/O addresses, wherein said memory management and control unit translates said virtual I/0 addresses received from said kernel processor and from said coprocessor into the real I/O addresses.

7. A computer system as claimed in claim 6, wherein said memory includes at least two banks, and said bundle includes a plurality of first address lines to accommodate a virtual address length which is at least two times that of a real address length for accessing a memory location in one of the banks, the banks being addressed by demultiplexing real addresses to first and second sets of separate address lines of the first address lines.

8. A computer system as claimed in claim 1, wherein said kernel processor, in conjunction with signals from said plurality of handshake control means, supplies virtual memory addresses to said memory management and control unit, said memory management and control unit translating the supplied virtual memory addresses into real addresses for transmission by the bundle to said memory and said plurality of attach control means.

9. A computer system as claimed in claim 8, wherein said memory includes at least two banks, and said bundle includes a plurality of first address lines to accommodate a virtual address length which is at least two times that of a real address length for accessing a memory location in one of the banks, the banks being addressed by demultiplexing real addresses to first and second sets of separate address lines of the first address lines.

10. A computer system as claimed in claim 1, wherein the coprocessor comprises four DMA control means and four handshake control means.

11. A computer system as claimed in claim 10, wherein each of the DMA control means comprises registers, and each of the handshake control means comprises a flip-flop.

* * * * *